June 27, 1933.   D. W. THOMAS   1,915,769
STEERING WHEEL
Filed June 6, 1929   6 Sheets-Sheet 1

INVENTOR
David W. Thomas
BY
Evans + McCoy
ATTORNEYS

INVENTOR
David W. Thomas
BY Evans & McCoy
ATTORNEYS

June 27, 1933. D. W. THOMAS 1,915,769
STEERING WHEEL
Filed June 6, 1929 6 Sheets-Sheet 3

INVENTOR
David W. Thomas
BY
Evans + McCoy
ATTORNEYS

June 27, 1933.  D. W. THOMAS  1,915,769
STEERING WHEEL
Filed June 6, 1929   6 Sheets-Sheet 4

INVENTOR
David W. Thomas
BY
Evans & McCoy
ATTORNEYS

June 27, 1933.  D. W. THOMAS  1,915,769
STEERING WHEEL
Filed June 6, 1929    6 Sheets-Sheet 6

INVENTOR
David W. Thomas
BY
Evans & McCoy
ATTORNEYS

Patented June 27, 1933

1,915,769

UNITED STATES PATENT OFFICE

DAVID W. THOMAS, OF YOUNGSTOWN, OHIO

STEERING WHEEL

Application filed June 6, 1929. Serial No. 368,792.

This invention relates to hand wheels and the like and the method of making same.

One of the objects of the present invention is to provide a new and improved hand wheel which can be easily and economically manufactured.

Another object is to provide a new and improved hand wheel embodying a single piece sheet metal member having tubular spoke and rim portions.

Another object is to provide such a wheel which may be embedded in a body of initially plastic composition material to render the same useful as a vehicle steering wheel.

Still another object is to provide such a sheet metal wheel embedded in a body of composition material with means for effecting the discharge of gases produced during the process of molding the composition material around the tubular sheet metal member.

A further object is to provide a wheel of the class described with reinforcing means at the points of connection of the spokes with the rim and at the hub portion thereof.

A still further object is to provide a method of making wheels of the class described.

With these and other objects in view, the present invention may be said to comprise the hand wheel and the particular method of making the same as illustrated in the accompanying drawings about to be described and particularly set forth in the appended claims, together with such variations and modifications thereof, as will be apparent to one skilled in the art to which this invention appertains.

In the drawings which illustrate suitable embodiments of this invention.

The wheel of the present invention was primarily designed for steering wheels to be used on motor vehicles, airplanes, boats and other conveyances, but it is to be understood that the same is equally as adaptable for use on various other devices. By using the metal member only, without the body of composition material which embeds the same, the wheel is particularly adaptable for children's toys, steam valves and fittings, brakes for freight cars and many other appliances which are actuated by hand wheels, because of the strength of the wheel and the smooth surface which it presents to operators' hands. It is therefore to be understood that the wheel of the present invention is not limited for use as steering wheels for motor vehicles and the like, but can be put to many other practical uses.

Heretofore, composition steering wheels embodying a single piece or built-up reinforcing spider embedded in a composition body, were of such construction that a considerable quantity of composition material was required to cover the reinforcement in order to obtain wheels of the desired dimensions. Consequently the excessive amount of composition material required increased the cost of the finished product.

The present invention proposes a metal spider formed from a single piece of sheet metal, the spokes and rim thereof being of tubular shape, and as a result of their tubular shapes it is evident that a considerable saving in the composition material is effected. It is also evident that by making the spokes and rim of tubular section, sheet metal of considerably lighter gauge than that previously used can be employed, with the result that the finished wheel can be manufactured at a lesser cost and will be of lesser weight yet of greater strength than reinforced composition steering wheels heretofore manufactured.

Figures 1, 2, 3, 4:
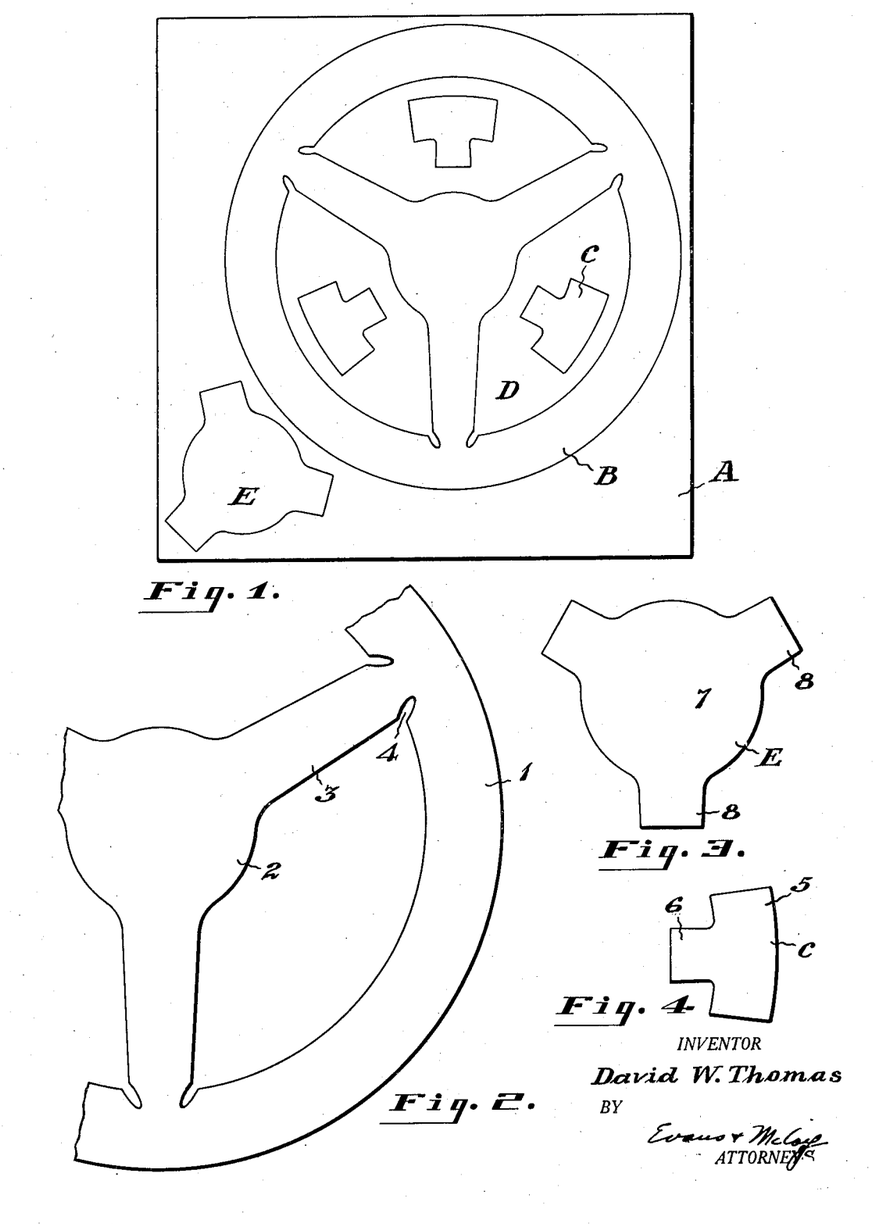
Figure 1 is a plan view of the sheet of metal from which the metal portion of the wheel is formed, the blanks from which the wheel and the reinforcements therefor are formed being outlined thereon.
Fig. 2 is a partial plan view of the wheel blank stamped from the sheet shown in Fig. 1.
Fig. 3 is a plan view of the blank from which the hub reinforcement member is formed.
Fig. 4 is a plan view of the blank from which the spoke and rim reinforcement is formed.

Referring to the accompanying drawings in which like numerals refer to like parts throughout the several views, the metal member for the wheel comprises a spider portion, a hub reinforcing portion and a T-shaped spoke and rim reinforcing portion, all of which are blanked from a sheet of metal A shown in Fig. 1. The blank B for the spider is first stamped out from the sheet of metal A and as stamped comprises a rim 1 and a hub 2 integrally connected thereto by spokes 3 as shown in Fig. 2, slits 4 being provided in the rim 1 and spokes 3 adjacent the sides of each spoke to permit the rim 1 and the spokes to be later bent into tubular form.

The blanks C for the spoke and rim reinforcements are preferably stamped from the triangular portions D of the waste material which are removed from the blank B to form the rim 1, hub 2 and spokes 3, as shown in Fig. 1. The blanks C are provided with a segmental rim portion 5 corresponding with the rim 1 of the spider, and a leg 6 corresponding with a spoke of the spider.

The hub reinforcing blank E is stamped from a corner of the sheet A from which the spider blank B is stamped. The hub reinforcing blank embodies a main body portion 7 slightly smaller than the hub 2 of the blank B and radial arms 8 arranged the same as the spokes 3 of the spider blank B.

In Fig. 1 the blanks B, C and E are shown in outline on the sheet of metal A to illustrate how the blanks C and E can be formed from the waste material left after the formation of the spider blank B. By stamping the reinforcing blanks C and E from scrap material, it is evident that a saving is effected in the material cost of the wheel.

Figure 5:
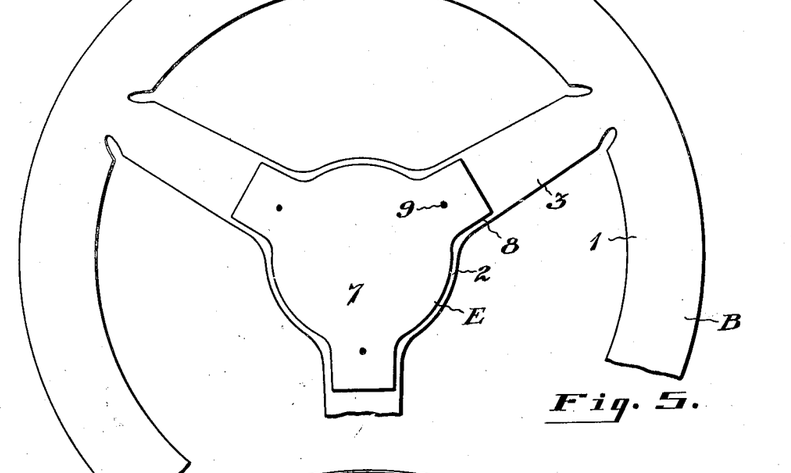
Fig. 5 is a partial plan view showing the hub reinforcing blank illustrated in Fig. 3 positioned on and welded to the wheel blank illustrated in Fig. 2.

After the flat blanks are formed, the hub reinforcing blank E is then positioned on the hub 2 of the spider blank B with the arms 8 thereof in alignment with the spokes 3 of the blank B as shown in Fig. 5, and the legs 8 are spot welded at 9 to the spokes 3 in order to hold the blank E in position during the subsequent forming operation.

Figure 6:
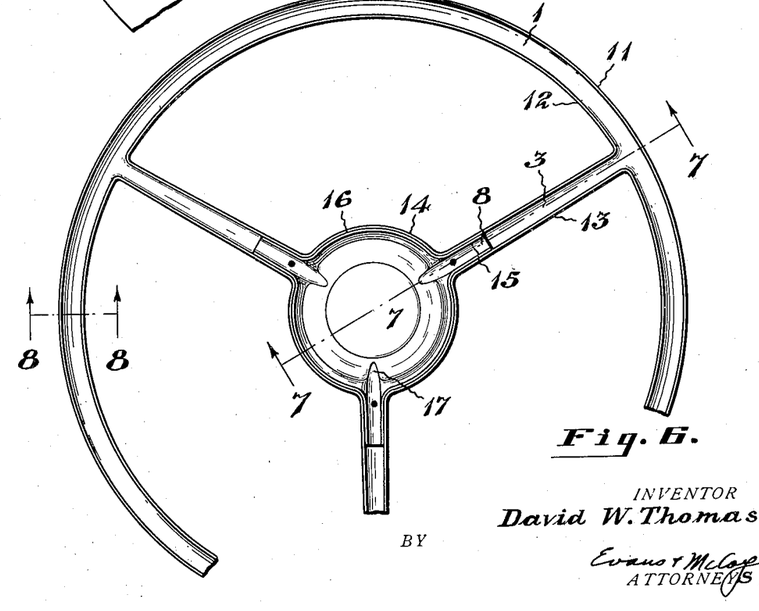
Fig. 6 is a partial bottom plan view of the wheel blank illustrated in Fig. 5, showing the appearance of the same after the first forming operation.
Figures 7, 8, 9, 10, 11, 12, 13, 14:
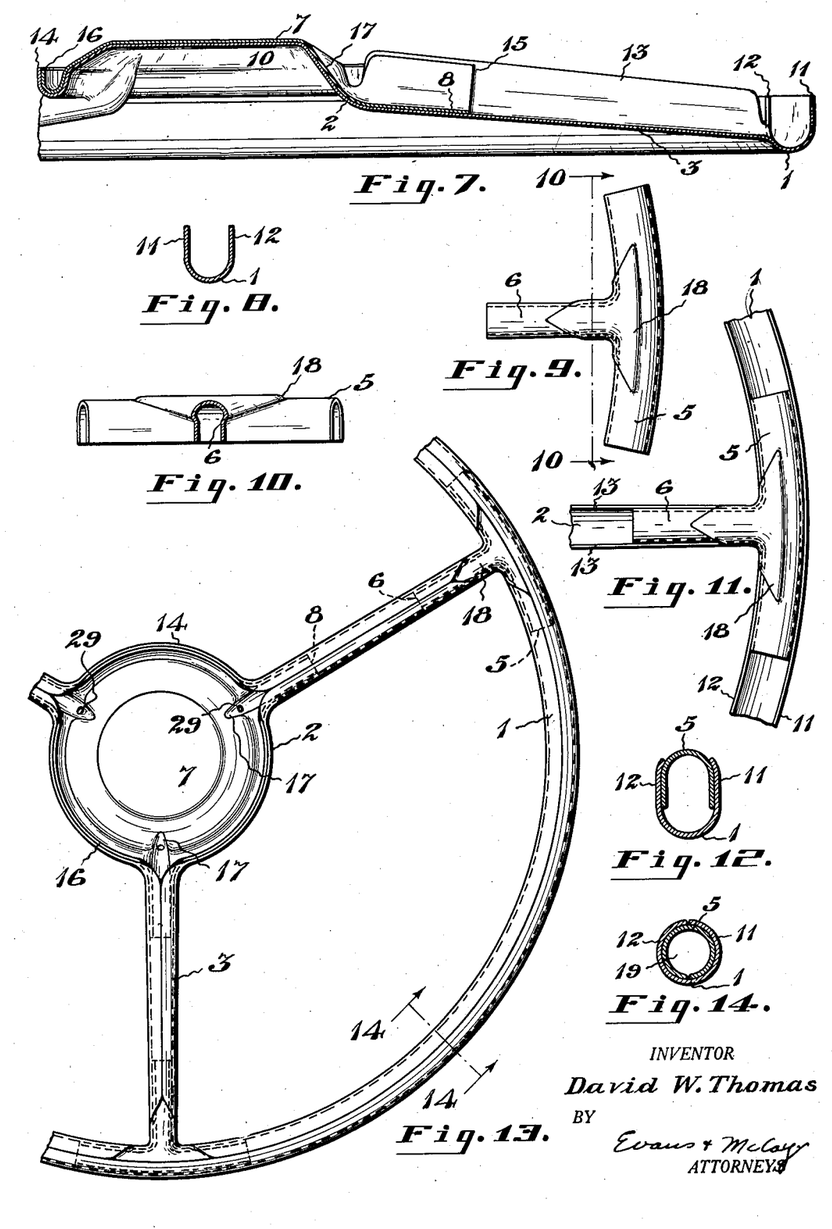
Fig. 7 is an enlarged section taken on the line 7—7 of Fig. 6.
Fig. 8 is an enlarged transverse section of the rim taken on the line 8—8 of Fig. 6.
Fig. 9 is an enlarged top plan view of one of the spoke and rim reinforcement formed from the blank shown in Fig. 4.
Fig. 10 is a transverse section taken on the line 10—10 of Fig. 9 showing the embossed portion of the spoke and rim reinforcement.
Fig. 11 is a partial plan view showing the spoke and rim reinforcement in position in the spoke and rim of the wheel member before the spokes and rim have been bent to tubular form.
Fig. 12 is a section taken through the rim adjacent one of the spokes showing the edges of the rim curled inwardly and engaging the spoke and rim reinforcement.
Fig. 13 is a bottom plan view of the metal wheel member showing the spokes and rim of the same bent into tubular form.
Fig. 14 is an enlarged transverse section taken on the line 14—14 of Fig. 13.

This forming operation consists in placing the blank B and hub reinforcement E in a preliminary forming press or die and pressing the same to the shape shown in Figs. 6, 7 and 8. As shown in these views, the spider blank B is dished, that is, the hub 2 is offset laterally with respect to the rim 1, and the hub portion 2 is cupped fairly deep as shown in Fig. 7 to provide a housing 10 for receiving various control members of a motor vehicle, such as a horn button or gas spark and light control mechanism. The rim 1 and spokes 3 are simultaneously formed preferably during the dishing and cupping operation to substantially a U-shape. This provides the rim 1 as shown in Figs. 7 and 8 with a continuous flange 11 at its outer edge which extends in the same direction as the dishing, and inner flanges 12 between the spokes 3, and also provides the spokes 3 with side flanges 13 extending in the same direction as the flanges 11 and 12 of the rim 1. The slits 4 at the connections of the spokes with the rim permits the rim and spokes to be formed to the U-shape described. The hub 2 is also at the same time formed with flanges 14 extending in the same direction as the spoke flanges 13 around the outer edge thereof between the spokes 3. The arms 8 of the hub reinforcing member E are likewise formed with side flanges 15, nested within the spokes 3 between the flanges 13, and with marginal flanges 16 nested with the flanges 14 of the spider hub portion 2. As shown in Figs. 6 and 7, the forming of the spokes 3 to a U-shape also provides depressions 17 in the walls of the cupped portion of the hub 2 and the hub reinforcing member E.

Although it is preferable to secure the hub reinforcing member E to the hub 2 of the spider by spot welding as described, it is to be understood that they may be held together during the cupping and preliminary forming operation by any other suitable means, or if desired, the forming dies may be designed to hold these two members together.

The hub reinforcing member E may be positioned on the outside of the spider if desired, and if this is preferred, the spokes and hub portion in this instance would be nested within the reinforcing member E, instead of the reverse condition as previously described. The sole function of the hub reinforcing member is to provide added reinforcement particularly at the connections of the spokes 3 with the hub portion 2.

The arcuate portion 5 and legs 6 of the spoke and rim reinforcing blanks C are then formed to a U-shape as shown in Figs. 9 and 10 and are provided with raised or embossed portions 18 on their convexly curved surfaces, the purposes of which will soon be described.

These T-shaped spoke and rim reinforcing members are then positioned in the spider in an inverted position with the arcuate U-shaped portion 5 seated within the flanges of the rim 1 and the U-shaped legs thereof seated within the spokes 3 as shown in Fig. 11. In other words, the spoke and rim reinforcing members are positioned in oppositely disposed relationship with respect to the rim, the section through the rim shown in Fig. 12 substantially illustrating this oppositely disposed relationship.

These spoke and rim reinforcing members are preferably made from sheet metal scrap as previously described, but may, if desired, be cast or formed in any other suitable manner.

The next forming operation preferably consists in bending the marginal edges of the spoke and rim flanges slightly inwardly in a suitable curling die, as shown in Fig. 12 to condition the same for the subsequent bending operation and to clamp the spoke and rim reinforcing members in position.

The flanges 11 and 12 of the rim 1 and the flanges 13 of the spokes 3 are next brought into marginal abutting relationship with each other in a suitable pressing operation. As shown in Figs. 13 and 14, the rim 1 and spokes 3 assume a tubular shape during this operation, and also during their bending operation cause the spoke and rim reinforcing members to move toward the bottoms of the rim and spoke channels and likewise assume a tubular shape as shown in Fig. 14. It might be said here that these reinforcing members assume a tubular T-shape, and are substantially enclosed by the rim and spokes of the spider. It is preferable, although not entirely essential, that the portions of these reinforcing members be formed to the tubular shape as just described, to provide a very rigid construction. The edges of the rim 1 and spokes 3 adjacent the spoke and rim reinforcing members abut against the sides of the embossed portions 18 so that a substantially continuous surface is provided at all points of the junctures of the spokes and rim. The advantages of having these continuous surfaces will be set forth in that portion of the application relating to embedding the spider in the composition body.

As shown in the bottom plan view illustrated in Fig. 13, relatively tight joints are provided between the abutting edges of the rim flanges and the abutting edges of the spoke flanges so that in effect, a continuous closed passageway 19 (Fig. 14) is provided in the rim 1, which leads into closed passageways 20 (Fig. 20) in the spokes 3, the spoke passageways 20 being open at the ends adjacent the hub 2 of the spider. These passageways 19 and 20 serve to provide means to assist in the discharge of gases formed during the operation of molding the composition material. This feature, however, will be described later in the specification.

Figures 15, 16, 17:
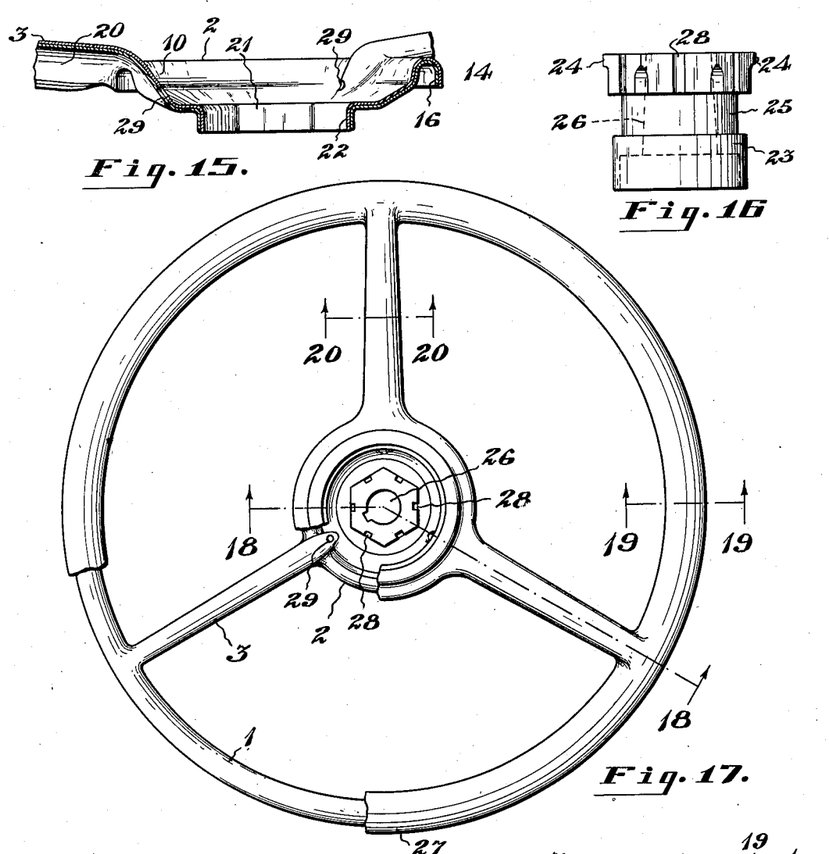
Fig. 15 is a section taken through the hub portion of the metal wheel member showing the flanged central opening formed thereon.
Fig. 16 is a side elevation of a separately formed hub member.
Fig. 17 is a plan view of the completed wheel, portions of the composition being broken away to show the tubular metal member embedded therein.

A central hub receiving opening 21 is then formed, as shown in Fig. 15, at the bottom of the cupped portion 10 of the hub 2 and body portion 7 of the hub reinforcing member, and the metal defining the opening 21 is bent at right angles in the direction of the dishing of the spider to provide a continuous flange 22. It is preferable to form this opening to a polygonal shape to receive the hub member 23 shown in Fig. 16.

The hub member 23 is preferably formed in an automatic screw machine from polygonal bar stock, and the intersecting faces of the stock are turned off for a portion of their length to provide overlying projections 24 at the upper end of the hub member 23. The other end of the hub 23 is turned to circular shape as shown and the hub is provided with a continuous circumferential groove 25 intermediate its ends.

The hub member 23 is forced through the opening 21 with a press fit so that the walls thereof firmly engage the corresponding faces of the flange 22 of the hub portion 2 of the spider. The overlying projections 24 of the hub 23 seat against the horizontal surface of the spider hub portion 2 and insure positive axial alignment of the hub 23 with the spider. The hub also is provided with a tapered central opening 26 for the reception of a shaft (not shown), which opening 26 is counterbored at its lower end.

The spider just described is formed from a single piece of thin gauge sheet metal, the spokes and rim of which are formed to a tubular shape and are provided with reinforcements at their junctures which fill in the space between the metal that is bent into tubular shape to close the rim and spokes. A reinforcement nested with the hub portion of the spider and extended into the spokes is provided to reinforce the spider at the juncture of the spokes with the hub portion. A separately formed hub member is also secured to the hub of the spider.

A wheel spider constructed in the manner just described is very light in weight but is very rigid in construction, because of the tubular rim and spokes, and also can be very economically manufactured. This wheel spider is very satisfactory for use on children's toys, large steam and water valves, hand brakes for railroad cars and many other appliances which are actuated by hand wheels, and can be of various sizes and dimensions. For use with devices such as those just described, it is not necessary to cup or dish the spider as just described.

If the wheel of the present invention is to be used as steering wheels for motor vehicles, airplanes, power boats and other conveyances, it is very desirable to embed the same in some material which is not affected to any great extent by temperature changes or by cold weather. A metal steering wheel is seldom used in the industry, because it retains the cold and makes driving very uncomfortable, and for this reason it is preferable to embed the same in some suitable material which is not very sensitive to heat or cold.

Figure 18:
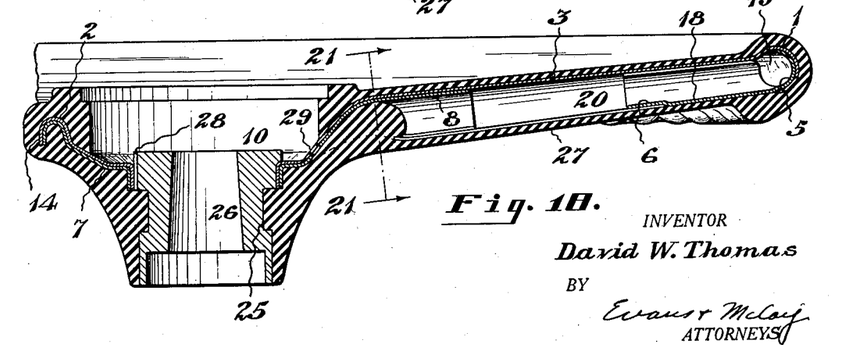
Fig. 18 is an enlarged section of the completed wheel taken on the line 18—18 of Fig. 17.

In Figs. 17 and 18, the sheet metal spider just described is shown embedded in a composition body 27. The spider is supported in a suitable mold cavity and suitable initially plastic composition material is molded around the same. If desired, the spider may be given a flashing of copper or other suitable metal so that the composition material will more readily adhere to the same.

During the molding operation, gases are formed within the rim and spokes because of the change in temperature of the metal, moisture and certain ingredients of the composition material, and for this reason it has been found advantageous to leave the ends of the spokes 3 open adjacent the hub 2 to prevent the gases from blowing out and causing the composition body 27 to become non-uniform and non-homogeneous. These gases flow through the rim and spoke passageways 19 and 20 and discharge at the open ends of the spokes 3 adjacent the hub. Axial grooves 28 are cut in the faces of the hub 23 as shown in Figs. 16 to 18, so that these gases will flow therethrough and discharge to the atmosphere at the cup portion 10 of the spider. Openings 29 may also be formed in the walls of the depressions 17 in the hub to assist in the discharge of these gases.

As shown in Figs. 17 and 18, the spider and hub 23 are completely embedded in the composition body 27 with the exception of the ends of the hub 23 and a portion of the hub 2 surrounding the upper end of the hub 23 to provide a depressed housing for the vehicle control mechanism. The composition when it is molded around the hub 23 flows into the circumferential groove 25 formed in the hub and provides a lock 30 of composition material which prevents the hub from inadvertently moving in an axial direction relative to the flange 22.

It is preferable to have the butt-joint at the meeting edges of the metal which is bent to form the tubular rim and spokes, disposed on the lower face of the wheel and substantially centrally of the rim so that when hydraulic molding pressure is applied to the wheel, the pressure will tend to close the joints in the rim and spokes, either because of the application of pressure radially of the wheel body with respect to the rim, or corresponding pressure with respect to the spokes, or because of pressure applied in the axial direction of the wheel with respect to the rim. This will tend to maintain tight butt joints in the rim and spokes and will assist in preventing the formation of large cavities which would ordinarily permit composition material to be released into the interior of the rim and spokes during the molding operation.

It is clearly evident to those acquainted with the manufacture of reinforced composition hand wheels that composition materials are expensive, and that by the use of the spider of the present invention a large saving in composition is obtained which greatly lowers the cost of manufacturing the wheels. The tubular rim and spokes occupy the greater area of the spokes and rim of the finished wheel, hence the considerable saving in composition.

Figure 19:
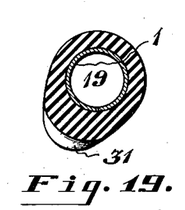
Fig. 19 is an enlarged transverse section of the rim taken on the line 19—19 of Fig. 17.
Figure 20:
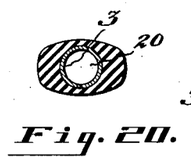
Fig. 20 is an enlarged transverse section of one of the spokes taken on the line 20—20 of Fig. 17.

In Figs. 19 and 20 the rim is shown to be of substantially oval cross section and provided with finger depressions 31 at its under face. The spoke shown in Fig. 20 is of oblong cross section. It is to be understood however that various other spoke and rim sections may be employed.

Figures 21, 23, 25, 26, 27, 28, 30:
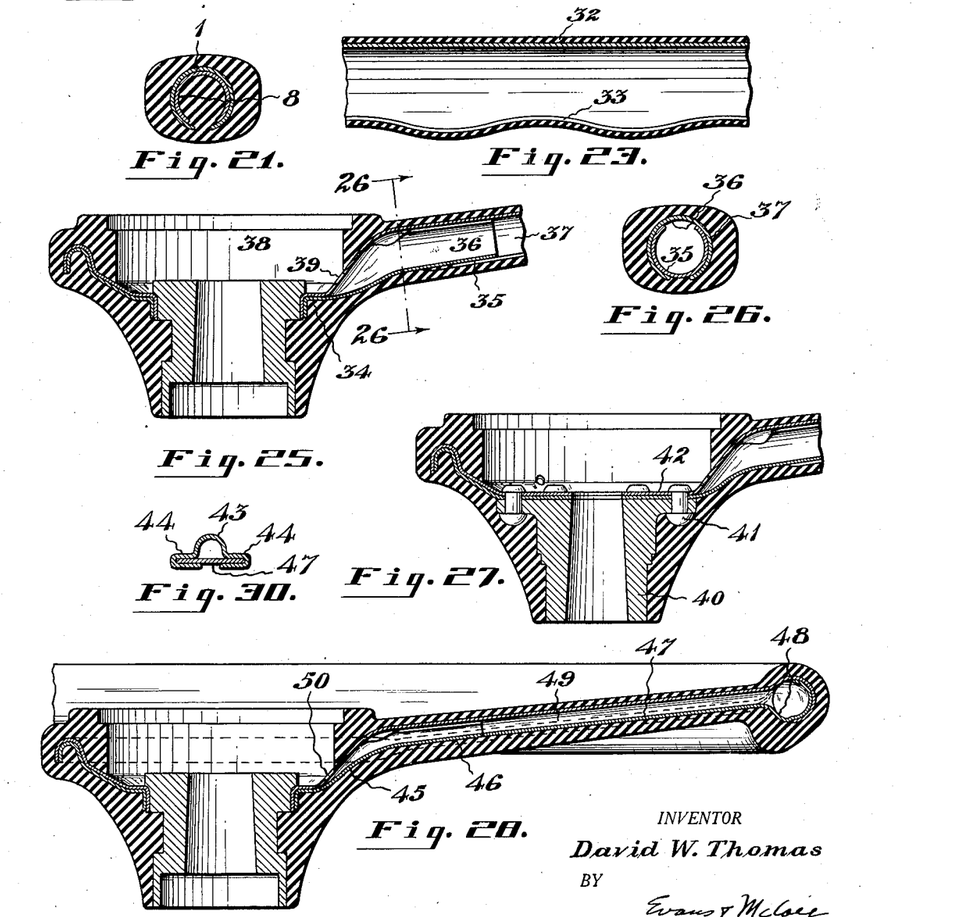
Fig. 21 is an enlarged transverse section taken on the line 21—21 of Fig. 18.
Fig. 23 is a section on the rim taken on the line 23—23 of Fig. 22.
Fig. 25 is a section through the hub portion of the wheel showing a modified reinforcement member.
Fig. 26 is a transverse section taken on the line 26—26 of Fig. 25.
Fig. 27 is a section through the hub of a wheel embodying an alternative form of hub member.
Fig. 28 is a section through a wheel embodying a metal wheel member embedded in composition material, the spokes of which are of modified construction.
Fig. 30 is a transverse section of one of the spokes taken on the line 30—30 of Fig. 29.
Figure 22:
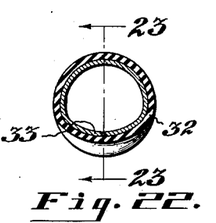
Fig. 22 is a transverse rim section of an alternative rim section having finger grip indentations formed therein.
Figure 24:
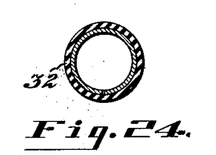
Fig. 24 is a transverse section of an alternative spoke form to be used in connection with the rim shown in Figs. 22 and 23.

Figs. 22, 23 and 24 illustrate round finished spoke and rim sections having a uniform coating 32 of composition at all points. The metal rim is formed with depressions 33 which receive the same uniform coating of composition material and provide the finger grip portions of the rim.

In cases where the rim and spokes are to be circular in finished cross section, and have a uniform coating of composition material, the spider may be dipped in a composition solution, or the composition may be applied by electrolytic deposition or by any of the other methods of embedding metal members in a composition body. By forming the embossed portions 18 on the spoke and rim reinforcing members as previously described, a substantial continuous surface is provided at the junctures of the spokes with the rim, which would satisfactorily permit the use of the dipping or electrolytic method of applying the composition material to the same, and would also permit a thin coating of composition to be applied.

Figs. 25 and 26 illustrate a slightly modified form of hub reinforcement. In this construction, the hub reinforcement 34 is not secured to the hub of the spider as previously described, but is assembled thereto in a manner similar to that used in assembling the spoke and rim reinforcements previously described. The radial arms 35 of the reinforcement are formed to a U-shape and are nested in oppositely disposed relationship in the spokes with respect thereto so that when the spokes are pressed to tubular shape the arms 35 are enclosed within the same. In this way, continuous passageways 36 are provided from the spoke passageways 37 to the hub portion of the spider which opens into the central control cup or depression 38 through openings 39 provided in the walls of the hub portion of the spider. Gases produced during the molding operation are exhausted through the openings 39 without coming in engagement with the composition material. This hub construction provides a preferable and satisfactory structure when the spider is to be coated with composition by the dipping or electrolytic deposition methods previously described because the ends of the spokes are closed in.

Fig. 27 illustrates a modified form of hub construction wherein a malleable casting or forged hub member 40 is secured by rivets 41 or bolts to the hub portion 42 of a spider constructed similar to that shown in Fig. 25. It is to be understood that the present invention is not limited to the particular methods of securing the hubs to the spiders disclosed in the drawings, and that any suitable means may be employed.

Figure 29:
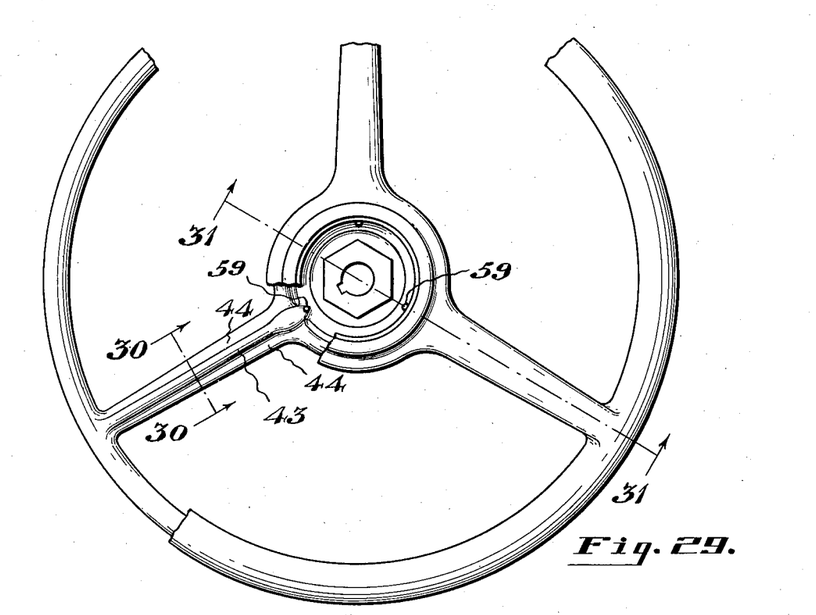
Fig. 29 is a partial plan view of the modified wheel shown in Fig. 28.

In Figs. 28, 29 and 30 a modified form of spider is shown and is constructed in the same manner as the first mentioned construction, with the exception that the spokes have been modified. As shown in this view, each spoke is formed with a longitudinal rib 43, the sides of the rib being spaced from each other, and horizontal portions 44. The hub reinforcing member 45 is formed similar to the construction shown in Fig. 25 with the radial arms 46 thereof flattened out and seated against the horizontal portions 44. The legs 47 of the spoke and rim reinforcing members 48 are somewhat longer than those previously described and are flattened out to seat against the horizontal portions 44 of the spokes and to abut against the ends of the arms 46 of the hub reinforcing member 45. The edges of the horizontal portions 44 of the spokes are doubled back to securely clamp the arms 46 of the member 45 and the legs 47 of the member 48 firmly against the spokes as shown in Fig. 30. In this way a continuous closed passageway 49 is provided from the rim, through the spokes and to the hub portion of the spider between the reinforcing member 45 and hub of the spider. The passageway is open only at the spider hub where openings 50 are provided, which passageway permits gases produced during the molding operation to escape through the openings 50 to the atmosphere without passing through the composition material.

Figures 31, 32, 33:
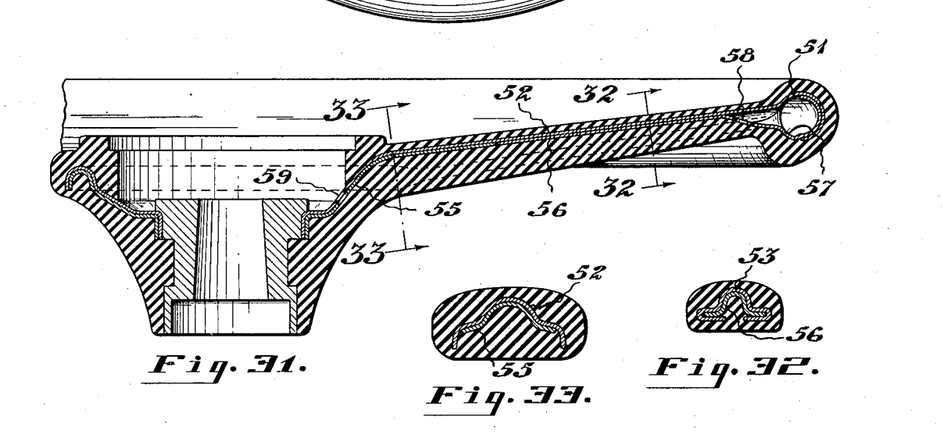
Fig. 31 is a section through a wheel embodying a further modified metal wheel member embedded in composition material.
Fig. 32 is a transverse section of one of the spokes taken on the line 32—32 of Fig. 31.
Fig. 33 is a section taken on the line 33—33 of Fig. 31.

A further modified spoke construction is illustrated in Figs. 31, 32 and 33, and embodies a rim 51 identical to that first described, and spokes 52 which are formed with a central longitudinal rim 53. The ends of the legs 54 of the hub reinforcing member 55 and the legs 56 of spoke and rim reinforcing members 57 abut against each other and are so ribbed and formed that they nest with the spokes 52, the marginal edges of the spokes being doubled back to clamp the legs 54 and legs 56 of the respective reinforcing members 55 and 57 in position. As shown in Fig. 32, an open channel is provided which extends from the rim to hub portion of the spider along the under side of the spokes. The gases which are formed in the rim 51 during the molding operation are discharged through openings 58 in the reinforcing members 51 and travel along the channels provided by the spoke ribs 53 and are finally discharged to the atmosphere through openings 59 formed in the hub of the spider.

In conclusion, it is clearly apparent that the present invention proposes a hand wheel construction of novel and greatly improved design which is light in weight, sturdy in construction and which can be very economically manufactured.

Furthermore, it is evident that by embedding the spider in a composition body that a suitable and efficient steering wheel is provided which is far superior to steering wheels previously manufactured because of its light weight, sturdiness, simplicity of construction, and low manufacturing cost. Also that by using the spider alone without the covering of composition material a hand wheel is provided for many other devices, which is very efficient and durable and highly desirable for such devices as previously mentioned.

Aside from the specific embodiments of the invention herein shown and described, it will be understood that numerous details of construction may be altered and omitted without departing from the spirit and scope of this invention, and it is not intended to limit the invention to the exact construction set forth, as it is desired to claim the invention broadly as well as specifically, as indicated in the appended claims.

What I claim is:

1. A single piece sheet metal steering wheel comprising a continuous rim, a hub, spokes connecting said rim and hub, said spokes and rim being of tubular form, and spoke and rim reinforcing members filling in the spaces between the edges of the metal at the junctures of said spokes and said rim.

2. A single piece sheet metal wheel, comprising a continuous rim, a hub, a plurality of spokes connecting said rim and hub, the metal of said spokes and rim being tubular in form and having the edges thereof at the junctures of said spokes with said rim spaced apart, and reinforcing members fitting within said rim and spokes to close in the spaces at said junctures.

3. A single piece sheet metal wheel, comprising a continuous rim, a central hub portion, a plurality of radial spokes connecting said rim and hub portion, the metal of said spokes and rim being tubular in form and having the edges thereof at the junctures of said spokes with said rim spaced apart, and T-shaped reinforcing members having portions seated within said rim and spokes bridging the spaces between the edges of said metal at said junctures.

4. A single piece sheet metal wheel, comprising a continuous rim, a central hub portion, a plurality of radial spokes connecting said rim and hub portion, the metal of said spokes and rim being tubular in form and having the edges thereof at the junctures of said spokes with said rim spaced apart, and sheet metal T-shaped reinforcing members having portions seated within said rim and spokes to close in the spaces between the edges of said metal at said junctures, said T-shaped members also being of tubular form.

5. A single piece sheet metal wheel, comprising a continuous rim, a central hub portion, a plurality of radial spokes connecting said rim and hub portion, the metal of said spokes and rim being tubular in form and having the edges thereof at the junctures of said spokes with said rim spaced apart, and hollow T-shaped strengthening members having portions enclosed by said spokes and rim and embossed portions extending into the spaces between the edges of the metal at said junctures to close in said spaces and to present surfaces subtantially continuous with said spokes and rim.

6. A single piece sheet metal wheel, comprising a continuous rim, a central hub portion, a plurality of radial spokes connecting said rim and hub portion, the metal of said spokes and rim being tubular in form and having the edges thereof at the junctures of said spokes with said rim spaced apart, T-shaped members having the arms thereof positioned within said spokes and rim to fill in the spaces between said edges of metal at said junctures and provide continuous substantially closed passageways in said spokes branching into the rim passageway, the ends of said spoke passageways being open only at said hub portion, and a body of initially plastic composition surrounding said spokes, rim and hub.

7. A composition steering wheel comprising a single piece sheet metal spoke, rim and hub reinforcement including a tubular rim, a hub annulus and tubular spokes integral with said hub annulus and rim, the marginal edges of the metal comprising said tubular rim being in abutting circumferential engagement in an axial direction except at the junctures of spokes and rim, to provide a rigid rim structure, the marginal edges of the metal comprising said tubular spokes also being in abutting engagement in an axial direction, separate metal members nesting within said spokes and rim and bridging the spaces between the marginal edges of the metal at the junctures of said spokes and rim said metal members spaced from the oppositely disposed metal of said spokes and rim to provide continuous openings between said spokes whereby relatively strong spoke and rim connections are provided, a separate hub secured to said hub annulus, and a body of composition material surrounding said sheet metal reinforcement.

8. In a composition steering wheel, a single piece sheet metal reinforcement including a rim, radial spokes and a hub annulus, said spokes and rim being tubular in cross section, said hub annulus being dished and having reversely bent flanges intermediate the spokes and said flanges being integral with said spokes, an annular element nested with said hub annulus and having arms extending into said tubular spokes whereby to bridge the space between the inner edges of said spokes and said hub annulus, a separate hub element carried by said annulus, and a body of composition material surrounding said rim and spokes and extending around the outer surface of said hub annulus.

9. In a composition steering wheel, a single piece sheet metal reinforcement including a rim, radial spokes and a hub annulus, said rim and spokes being tubular in cross section, said hub annulus being dished away from the plane of said spokes and having arched portions forming continuations of the curvature of said spokes merging into the inner circumferential face of said annulus, an annular element nested against said hub annulus and having tubular radially extending arms extending into and being surrounded by the metal of said tubular spokes, a hub element carried by said annulus, and a body of composition material surrounding said rim and spokes.

10. In a composition steering wheel, a single piece sheet metal reinforcement including a tubular rim, tubular spokes and a hub annulus, said hub annulus being dished and having radial depressions therein presenting outwardly to form continuations of said tubular spokes, said hub annulus also having axial marginal flanges extending circumferentially between the spokes and in the direction of dish of said annulus, said flanges merging into said spokes, an element secured to said hub annulus and having radial arms extending into said spokes, said arms having portions spaced from and opposed to the bottoms of said depressions whereby to provide a continuous tubular passageway extending throughout said spokes to said hub annulus, and a hub element secured to said annulus.

In testimony whereof I affix my signature.

DAVID W. THOMAS.